(12) United States Patent
Wyss et al.

(10) Patent No.: US 11,134,155 B1
(45) Date of Patent: Sep. 28, 2021

(54) TECHNOLOGIES FOR AUTOMATED GENERATION OF CONTACT CENTER SYSTEM EMBEDDINGS

(71) Applicant: Genesys Telecommunications Laboratories, Inc., Daly City, CA (US)

(72) Inventors: Felix Immanuel Wyss, Indianapolis, IN (US); Ramasubramanian Sundaram, Hyderabad (IN); Aravind Ganapathiraju, Hyderabad (IN)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

(21) Appl. No.: 17/139,033

(22) Filed: Dec. 31, 2020

(51) Int. Cl.
*H04M 3/00* (2006.01)
*H04M 3/523* (2006.01)
(Continued)

(52) U.S. Cl.
CPC ............ *H04M 3/5233* (2013.01); *G06N 3/08* (2013.01); *G06Q 10/063112* (2013.01); *G06Q 10/105* (2013.01); *H04M 3/5175* (2013.01)

(58) Field of Classification Search
CPC . H04M 3/5233; H04M 3/5175; H04M 3/5235
See application file for complete search history.

(56) References Cited

U.S. PATENT DOCUMENTS

| | | | | |
|---|---|---|---|---|
| 9,215,322 B1* | 12/2015 | Wu | ...................... | H04M 3/5235 |
| 2015/0189088 A1* | 7/2015 | Surridge | ............. | H04M 3/5233 379/265.12 |
| 2021/0021709 A1* | 1/2021 | Scodary | .............. | H04M 3/5233 |

OTHER PUBLICATIONS

Tomas Mikolov et al.; Distributed Representations of Words and Phrases and Their Compositionality; Neural Information Processing Systems; Oct. 16, 2013; 9 pages.
(Continued)

*Primary Examiner* — Rasha S Al Aubaidi
(74) *Attorney, Agent, or Firm* — Taft Stettinius & Hollister LLP

(57) ABSTRACT

A method for automated generation of contact center system embeddings according to one embodiment includes determining, by a computing system, contact center system agents, contact center system agent skills, and/or contact center system virtual queue experiences; generating, by the computing system, a matrix representation based on the contact center system agents, the contact center system agent skills, and/or the contact center system virtual queue experiences; generating, by the computing system and based on the matrix representation, contact center system agent identifiers, contact center system agent skills identifiers, and/or contact center system virtual queue identifiers; transforming, by the computing system, the contact center system agent identifiers, the contact center system agent skills identifiers, and/or the contact center system virtual queue identifiers into the contact center system agent embeddings, contact center system agent skills embeddings, and/or contact center system virtual queue embeddings, wherein weights of the contact center system agent embeddings, the contact center system agent skills embeddings, and/or the contact center system virtual queue embeddings are randomly initialized; and training, by the computing system, the contact center system agent embeddings, the contact center system agent skills embeddings, and/or the contact center system virtual queue embeddings by applying machine learning to obtain final weights of the contact center system agent embeddings, the contact center system agent skills embeddings, and/or the contact center system virtual queue embeddings.

20 Claims, 7 Drawing Sheets

(51) Int. Cl.
*G06Q 10/10* (2012.01)
*H04M 3/51* (2006.01)
*G06N 3/08* (2006.01)
*G06Q 10/06* (2012.01)

(56) References Cited

OTHER PUBLICATIONS

Readme.MD; Gensim—Topic Modelling in Python; May 22, 2010; https://github.com/RaRe-Technologies/gensim; 5 pages.

\* cited by examiner

|  | Lang skill 1 | Lang skill 2 | Lang skill 3 | Product skill 1 | Product skill 2 | Product skill 3 | Virtual Queue 1 | Virtual Queue 2 | Virtual Queue 3 |
|---|---|---|---|---|---|---|---|---|---|
| Agent 1 | 1 | 0 | 1 | 0 | 0 | 1 | 0 | 1 | 0 |
| Agent 2 | 1 | 1 | 0 | 0 | 0 | 1 | 1 | 0 | 0 |
| Agent 3 | 0 | 0 | 1 | 1 | 0 | 0 | 0 | 0 | 0 |
| ... | ... | ... | ... | ... | ... | ... | ... | ... | ... |
| Agent N | 0 | 1 | 0 | 0 | 1 | 0 | 1 | 0 | 0 |

FIG. 2

| Agent_id_1 | Skill_id_1 | 1 |
| Agent_id_1 | Skill_id_2 | 0 |
| Agent_id_1 | Skill_id_3 | 1 |
| Agent_id_N | Skill_id_M | 0 |

FIG. 4

TECHNOLOGIES FOR AUTOMATED GENERATION OF CONTACT CENTER SYSTEM EMBEDDINGS

BACKGROUND

Contact center agents may have a set of particular skills and may help a variety of different end users. Contact centers may often receive many more end user telephony calls than there are available agents to manage such calls. End users may desire for their calls to be answered by agents that are most qualified to answer their questions and/or agents that have answered their questions before. However, it may not always be possible for the most qualified agent and/or the same agent to answer an end user's calls since an agent may be unavailable for various different reasons (e.g., busy on a call with another end user, etc.). A problem is that it may be difficult to find another agent that is most similar to the unavailable agent to route the call to.

Additionally, after a new agent is hired by a contact center, it may not be known which virtual queue to assign the new agent to in the contact center or which types of end users the new agent should be receiving calls from. A problem is that assigning a new agent to a virtual queue in which the new agents does not have the skills to be successful may result in the new agent being unproductive and/or increasing the ramp-up time for the new agent to become productive.

SUMMARY

According to an embodiment, a method for automated generation of contact center system embeddings may include determining, by a computing system, at least one of one or more contact center system agents, one or more contact center system agent skills, and one or more contact center system virtual queue experiences; generating, by the computing system, a matrix representation based on the at least one of the one or more contact center system agents, the one or more contact center system agent skills, and the one or more contact center system virtual queue experiences; generating, by the computing system and based on the matrix representation, at least one of one or more contact center system agent identifiers, one or more contact center system agent skills identifiers, and one or more contact center system virtual queue identifiers; transforming, by the computing system, the at least one of the one or more contact center system agent identifiers, the one or more contact center system agent skills identifiers, and the one or more contact center system virtual queue identifiers into at least one of one or more contact center system agent embeddings, one or more contact center system agent skills embeddings, and one or more contact center system virtual queue embeddings, wherein weights of the at least one of the one or more contact center system agent embeddings, the one or more contact center system agent skills embeddings, and the one or more contact center system virtual queue embeddings are randomly initialized; and training, by the computing system, the at least one of the one or more contact center system agent embeddings, the one or more contact center system agent skills embeddings, and the one or more contact center system virtual queue embeddings by applying machine learning to obtain final weights of the at least one of the one or more contact center system agent embeddings, the one or more contact center system agent skills embeddings, and the one or more contact center system virtual queue embeddings.

In some embodiments, the method may further include determining, by the computing system, a similarity of at least one of two or more of the contact center system agent embeddings, two or more of the contact center system agent skills embeddings, and two or more of the contact center system virtual queue embeddings based on comparing the final weights of the at least one of the one or more of the contact center system agent embeddings, the one or more of the contact center system agent skills embeddings, and the one or more of the contact center system virtual queue embeddings.

In some embodiments, determining the similarity of the at least one of the two or more contact center system agent embeddings, the two or more contact center system agent skills embeddings, and the two or more contact center system virtual queue embeddings may include utilizing at least one of cosine similarity, principal component analysis, or t-distributed stochastic neighbor embedding.

In some embodiments, the method may further include at least one of routing a telephony call to a contact center system agent in response to determining the similarity of the at least one of the two or more of the contact center system agent embeddings, the two or more of the contact center system agent skills embeddings, and the two or more of the contact center system virtual queue embeddings; and assigning a contact center system agent to a virtual queue in response to determining the similarity of the at least one of the two or more of the contact center system agent embeddings, the two or more of the contact center system agent skills embeddings, and the two or more of the contact center system virtual queue embeddings.

In some embodiments, the at least one of the one or more contact center system agent embeddings, the one or more contact center system agent skills embeddings, and the one or more contact center system virtual queue embeddings may include k-dimensional vectors.

In some embodiments, the k-dimensional vectors may be in five-dimensional space or ten-dimensional space.

In some embodiments, at least one of the transforming and the training may be based on a neural network.

In some embodiments, may further include transforming the matrix representation into a single row representation for training.

In some embodiments, wherein applying machine learning to obtain the final weights may include determining a dot product and ground truth of the at least one of the one or more contact center system agent embeddings, the one or more contact center system agent skills embeddings, and the one or more contact center system virtual queue embeddings.

In some embodiments, the one or more contact center system agent skills may include at least one of one or more language skills, one or more product skills, or one or more education skills.

According to another embodiment, a system for automated generation of contact center system embeddings may include at least one processor; and at least one memory comprising a plurality of instructions stored thereon that, in response to execution by the at least one processor, causes the system to determine, by a computing system, at least one of one or more contact center system agents, one or more contact center system agent skills, and one or more contact center system virtual queue experiences; generate, by the computing system, a matrix representation based on the at least one of the one or more contact center system agents, the one or more contact center system agent skills, and the one or more contact center system virtual queue experiences;

generate, by the computing system and based on the matrix representation, at least one of one or more contact center system agent identifiers, one or more contact center system agent skills identifiers, and one or more contact center system virtual queue identifiers; transform, by the computing system, the at least one of the one or more contact center system agent identifiers, the one or more contact center system agent skills identifiers, and the one or more contact center system virtual queue identifiers into at least one of one or more contact center system agent embeddings, one or more contact center system agent skills embeddings, and one or more contact center system virtual queue embeddings, wherein weights of the at least one of the one or more contact center system agent embeddings, the one or more contact center system agent skills embeddings, and the one or more contact center system virtual queue embeddings are randomly initialized; and train, by the computing system, the at least one of the one or more contact center system agent embeddings, the one or more contact center system agent skills embeddings, and the one or more contact center system virtual queue embeddings by applying machine learning to obtain final weights of the at least one of the one or more contact center system agent embeddings, the one or more contact center system agent skills embeddings, and the one or more contact center system virtual queue embeddings.

In some embodiments, the plurality of instructions may further cause the system to determine, by the computing system, a similarity of at least one of two or more of the contact center system agent embeddings, two or more of the contact center system agent skills embeddings, and two or more of the contact center system virtual queue embeddings based on comparing the final weights of the at least one of the one or more of the contact center system agent embeddings, the one or more of the contact center system agent skills embeddings, and the one or more of the contact center system virtual queue embeddings.

In some embodiments, determining the similarity of the at least one of the two or more contact center system agent embeddings, the two or more contact center system agent skills embeddings, and the two or more contact center system virtual queue embeddings may include utilizing at least one of cosine similarity, principal component analysis, or t-distributed stochastic neighbor embedding.

In some embodiments, the plurality of instructions may further cause the system to route a telephony call to a contact center system agent in response to determining the similarity of the at least one of the two or more of the contact center system agent embeddings, the two or more of the contact center system agent skills embeddings, and the two or more of the contact center system virtual queue embeddings; or assign a contact center system agent to a virtual queue in response to determining the similarity of the at least one of the two or more of the contact center system agent embeddings, the two or more of the contact center system agent skills embeddings, and the two or more of the contact center system virtual queue embeddings.

In some embodiments, the at least one of the one or more contact center system agent embeddings, the one or more contact center system agent skills embeddings, and the one or more contact center system virtual queue embeddings may include k-dimensional vectors.

In some embodiments, the k-dimensional vectors may be in five-dimensional space or ten-dimensional space.

In some embodiments, at least one of the transforming and the training may be based on a neural network.

In some embodiments, the plurality of instructions may further cause the system to transform the matrix representation into a single row representation for training.

In some embodiments, applying machine learning to obtain the final weights may include determining a dot product and ground truth of the at least one of the one or more contact center system agent embeddings, the one or more contact center system agent skills embeddings, and the one or more contact center system virtual queue embeddings.

In some embodiments, the one or more contact center system agent skills may include at least one of one or more language skills, one or more product skills, or one or more education skills.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 2 is at least one embodiment of a matrix representation based on contact center system agent skills and contact center system virtual queue experiences that contact center system agents may possess;

FIG. 4 is at least one embodiment of a single row representation of the matrix representation of FIG. 2 for neural network training;

DETAILED DESCRIPTION

Figure 1:
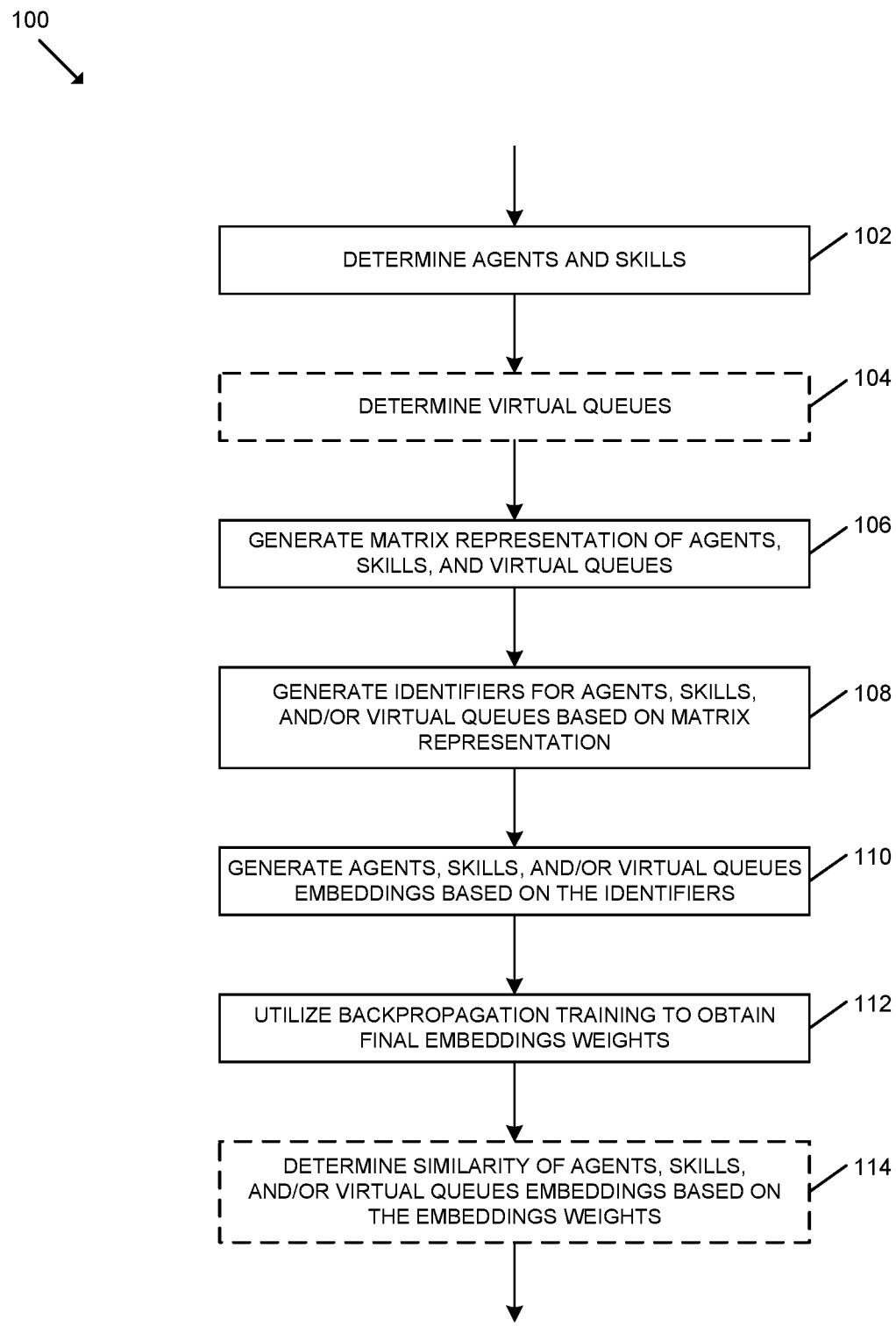
FIG. 1 is a simplified flow diagram of at least one embodiment of a method for automated generation of contact center system embeddings.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in use, the computing system 700 may execute a method 100 for the automated generation of contact center system embeddings. In some embodiments, the contact center system embeddings may include at least one of one or more contact center system agent embeddings, one or more contact center system agent skills embeddings, and one or more contact center system virtual queue embeddings. It should be appreciated that the particular blocks of the method 100 are illustrated by way of example, and such blocks may be combined or divided, added or removed, and/or reordered in whole or in part depending on the particular embodiment, unless stated to the contrary.

A contact center system may be embodied as any system capable of providing contact center services (e.g., call center services) to an end user and otherwise performing the functions described herein. Depending on the particular embodiment, it should be appreciated that a contact center system may be located on the premises of an organization utilizing a contact center system and/or located remotely relative to an organization (e.g., in a cloud-based computing environment). In some embodiments, a portion of a contact center system may be located on an organization's premises/campus while other portions of a contact center system are located remotely relative to an organization's premises/campus. As such, it should be appreciated that a contact center system may be deployed in equipment dedicated to an organization or third-party service provider thereof and/or deployed in a remote computing environment such as, for example, a private or public cloud environment with infrastructure for supporting multiple contact centers for multiple enterprises. In some embodiments, a contact center system includes resources (e.g., personnel, computers, and telecommunication equipment) to enable delivery of services via telephone and/or other communication mechanisms. Such services may include, for example, technical support, help desk support, emergency response, and/or other contact center services depending on the particular type of contact center.

Contact center system agents may have a set of particular skills. The values ascribed to such skills may be dependent upon the contact center system that the agents are assigned to or the assistance the agents provide to end users. In some embodiments, an agent skill may include a language skill, a product skill, or an education skill. A language skill may be a skill regarding the type of language that an agent may speak and/or understand. In some embodiments, the language skill may be at least one of English, Spanish, French, German, Russian, Portuguese, Mandarin Chinese, or Hindi. For example, if a contact center system supports end users that speak English, Spanish, French, and German, then an agent may have one or more language skills if such agent speaks one or more of those languages. It should be appreciated that a language skill may include a skill regarding any spoken language. A product skill may be a skill regarding the type of products that an agent may support (i.e., provide support to end users regarding queries concerning such products). For example, if a contact center system for Company A supports Company A's products X, Y, and Z, then an agent that is proficient in product X and Z may possess the product skills X and Z. An education skill may be a skill regarding an educational qualification. It should be further appreciated that agent skills may include any variety of skills that may be necessary or helpful to support a contact center system.

Contact center system virtual queues may also be used to describe an agent. In some embodiments, an agent may have one or more contact center system virtual queue experiences. For example, when an end user places a call to speak with an agent of a contact center system, the call may be placed in a virtual queue of the contact center system. An agent may be assigned to a particular virtual queue and have an expertise regarding the subject matter represented by such virtual queue or the types of end users the agent may be receiving calls from in such virtual queue. Virtual queues may be more dynamic than agent skills because unlike a language skill or an education skill the virtual queues that an agent may be assigned to may often change. For example, an agent may be assigned to a virtual queue for "billing inquiries" and then may be reassigned to another virtual queue such as "new orders inquiries" a week later.

An embedding may be a mapping of a discrete entity to a vector of continuous numbers. Contact center system agents may be discrete entities. Embeddings may be low-dimensional, learned continuous vector representations of discrete entities (i.e., agents). Embeddings may reduce the dimensionality of discrete entities and meaningfully represent variables in transformed space. It should be appreciated that embeddings may have a several purposes, including, for example, finding the nearest neighbors in the embedding space, which may be used to make recommendations based on cluster categories. Additionally, embeddings may be used as inputs to a machine learning model for a supervised task. Further, embeddings may be used for visualization of concepts and relations between categories. Once in vector form, two agents may be compared to determine how similar such agents are to each other. Vectors may be added or subtracted to give rise to newer vectors. The process of transforming a discrete entity such as an agent into a vector may generally involve a large amount of data and training such data using machine learning. In some embodiments, a neural network approach may be utilized to generate (e.g., automatically) the contact center system embeddings.

The computing system 700 may include and/or leverage artificial intelligence, adaptive learning, bots, cognitive computing, and/or other automation technologies. For example, in some embodiments, the computing system 700 may utilize one or more neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, rule-based algorithms, ensemble algorithms, artificial intelligence, and/or other suitable machine learning algorithms, artificial intelligence algorithms, techniques, and/or mechanisms.

It should be appreciated that the technologies described herein may allow for the leveraging of agent skills and/or virtual queues to generate agent profiles (i.e., embeddings). Agent profiles/embeddings may allow the grouping of agents together with similar skills and/or virtual queue experience, which may help provide better end user experiences. For example, when an agent is unavailable to receive a call, the call may be routed to the most similar available agent. Similarly, when a newly hired agent joins a contact center system, agent profiles may be used to group agents together based on agent skills and/or virtual queue experience to allow the agents to be productive sooner.

Prior to execution of the method 100, it should be appreciated that a user may interact with the computing system 700 via a graphical user interface of an application in order to upload an agent resume, job application, and/or other information listing agent skills and/or work history (i.e., a virtual queue that an agent has worked in before). The illustrative method 100 may begin with block 102 in which the computing system 700 may determine that an agent possesses one or more contact center system agent skills. For example, the computing system 700 may determine that the agent speaks English and Spanish (i.e., the agent has language skills) and supports products X and Y (i.e., the agent has product skills). In block 104, the computing system 700 may determine that the agent has one or more virtual queue experiences. For example, the computing system 700 may determine that the agent has experience working in a virtual queue for "billing."

In block 106, the computing system 700 may generate a matrix representation based on at least one of one or more contact center system agents, one or more contact center system agent skills, and/or the one or more virtual queue experiences. For example, FIG. 2 illustrates a matrix representation based on the one or more contact center system agents, one or more contact center system agent skills, and/or the one or more virtual queue experiences. In the example illustrated in FIG. 2, the table may be viewed as a matrix in which agents are represented as rows and agent skills and/or virtual queue experiences are represented as columns. For example, "Lang Skill 1," "Lang Skill 2," and "Lang Skill 3" represent language skills; "Product Skill 1," "Product Skill 2," and "Product Skill 3" represent product skills; and "Virtual Queue 1," "Virtual Queue 2," and "Virtual Queue 3" represent virtual queue experiences. Similarly, for example, "Agent 1," "Agent 2," and "Agent N" represent contact center system agents. If an agent possesses a skill, then the table is marked with a "1." If an agent does not possess a skill, then the table is marked with a "0." The numbers "1" and "0" included in the matrix representation illustrated in FIG. 2 are sparse because each agent may have only a few skills compared to the total number of skills represented in the table. For example, "Agent 1" possesses "Lang Skill 1" (e.g., German) and "Lang Skill 3" (e.g., French) but not "Lang Skill 2" (e.g., Hindi). It should be appreciated that the matrix representation may include any number of contact center system agents, contact center system agent skills, and virtual queue experiences as desired, including, for example, tens to tens of thousands of entries (or more).

Referring back to FIG. 1, in block 108, the computing system 700 may generate, based on the matrix representation generated in block 106, at least one of the one or more contact center system agent identifiers, the one or more contact center system agent skills identifiers, and the one or more contact center system virtual queue identifiers. Referring back to FIG. 2, identifiers 1, 2, and 3 have been generated for three different agents (e.g., "Agent 1," "Agent 2," and "Agent 3"). If there are "N" agents, the generated identifiers may be 1 through "N." Similarly, as illustrated in FIG. 2, identifiers 1, 2, and 3 have been generated for three different language skills (e.g., "Lang Skill 1," "Lang Skill 2," and "Lang Skill 3"), three different product skills (e.g., "Product Skill 1," "Product Skill 2," and "Product Skill 3"), and three different virtual queue experiences (e.g., "Virtual Queue 1," "Virtual Queue 2," and "Virtual Queue 3"). If there are "M" agent skills and virtual queues, the generated identifiers may be 1 through "M."

Referring back to FIG. 1, in block 110, the computing system 700 may transform at least one of the one or more contact center system agent identifiers, the one or more contact center system agent skills identifiers, and the one or more contact center system virtual queue identifiers into at least one of one or more contact center system agent embeddings, one or more contact center system agent skills embeddings, and one or more contact center system virtual queue embeddings. As described above, building an embedding may include transforming a discrete entity (e.g., an agent) into a vector. For example, the computing system 700 may transform the one or more contact center system agent identifiers generated in block 108 (e.g., "Agent 1," "Agent 2," and "Agent 3") into the one or more contact center system agent embeddings. Additionally, for example, the computing system 700 may transform the one or more contact center system agent skills identifiers generated in block 108 (e.g., "Lang Skill 1," "Lang Skill 2," etc. or "Product Skill 1," "Product Skill 2," etc.) into the one or more contact center system agent skills embeddings. Further, for example, the computing system 700 may transform the one or more contact center system virtual queue identifiers generated in block 108 (e.g., "Virtual Queue 1," "Virtual Queue 2," etc.) into the one or more contact center system virtual queue embeddings. In some embodiments, the one or more contact center system agent embeddings, the one or more contact center system agent skills embeddings, and the one or more contact center system virtual queue embeddings may be k-dimensional vectors. In some embodiments, the k-dimensional vectors are in five-dimensional space (i.e., K=5). In some embodiments, the k-dimensional vectors are in ten-dimensional space (i.e., K=10). For example, in embodiments including contact center system agents, the computing system 700 may transform "Agent 1," "Agent 2," and "Agent 3" into k-dimensional vectors for each agent, and, if K=5, each agent may be represented as a k-dimensional vector as shown below:

[1]=[0.1, 0.07, −0.43, 0.68, 0.01]
[2]=[−0.7, 0.65, 0.03, −0.05, 0.38]
[N]=[0.1, 0.08, −0.39, 0.75, 0.05]

"Agent 1" may be represented as [1]. "Agent 2" may be represented as [2]. "Agent N" may be represented as [N]. Each decimal may represent a different dimension and a particular weight for the three contact center system agent embeddings illustrated in this example. It should be appreciated that the one or more contact center system agent skills embeddings and/or the one or more contact center system virtual queue embeddings may be similarly represented as k-dimensional vectors in the five-dimensional space as illustrated in this example.

Figure 3:
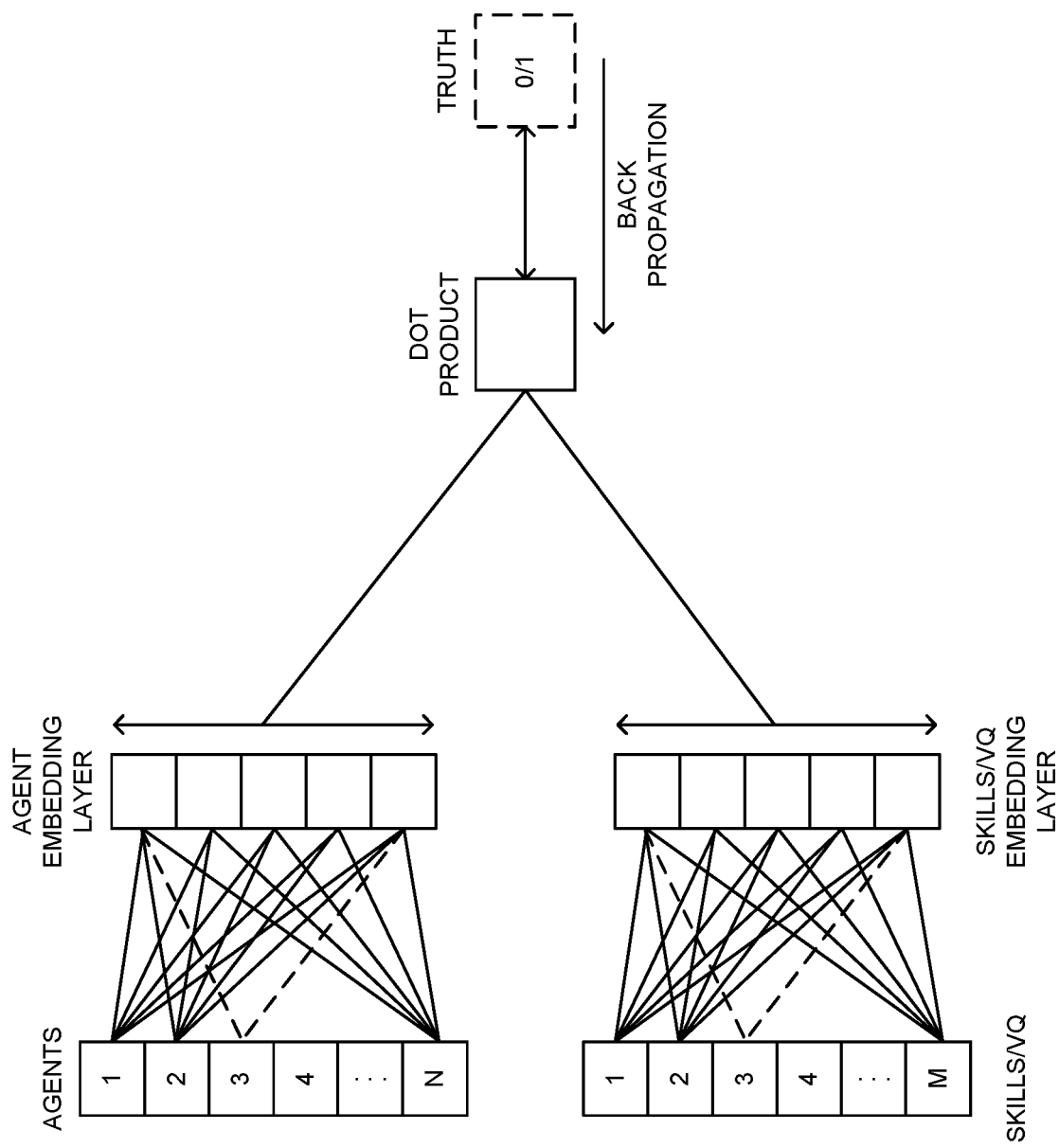
FIG. 3 is at least one embodiment of a neural network that may be utilized for the automated generation of contact center system embeddings.

FIG. 3 illustrates a neural network that may be utilized for the automated generation of contact center system embeddings. In the illustrative embodiment, the Agents and Skills/Virtual Queue (e.g., "VQ") are two parts of the neural network. Additionally, the Agents may represent the rows and the Skills/Virtual Queue (e.g., "VQ") may represent the columns in the matrix representation generated in block 106. The K arrows from each Agent identifier may represent the Agent Embedding. Similarly, the K arrows from each Skills/Virtual Queue may represent the Skills/Virtual Queue Embedding. The Agent Embedding Layer and the Skills/VQ Embedding Layer each include five boxes representing the five-dimensional space. The computing system 700 may initially generate randomly initialized weights for the five-dimensional space (i.e., the K arrows may include the randomly initialized weights). For example, the computing system 700 may generate randomly initialized weights for the one or more contact center system agent embeddings, one or more contact center system agent skills embeddings, and one or more contact center system virtual queue embeddings.

Referring back to FIG. 1, in block 112, the computing system 700 may utilize machine learning to train at least one of the one or more contact center system agent embeddings, the one or more contact center system agent skills embeddings, and the one or more contact center system virtual queue embeddings to obtain the final weights for the one or more contact center system agent embeddings, the one or more contact center system agent skills embeddings, and the one or more contact center system virtual queue embeddings. For example, the computing system 700 may utilize back propagation training to obtain the final weights for the contact center system embeddings. The neural network may learn the k-dimensional vectors for each of the one or more contact center system agents, the one or more contact center system agent skills, and the one or more contact center system virtual queue experiences.

Referring now to FIG. 4, the computing system 700 may transform the matrix representation generated in block 106 into a single row representation for neural network training. For example, the computing system 700 may transfer each agent-skill/VQ pair from the matrix representation generated in block 106 to a single row representation. The single row representation may include the input data for the neural network, including, for example, "Agent_id" and "Skill_id." Referring back to FIG. 1, the computing system 700 may analyze the dot product and ground truth (i.e., a 0 or a 1) of the one or more contact center system agent embeddings, the one or more contact center system agent skills embeddings, and the one or more contact center system virtual queue embeddings to determine the final weights of such embeddings. By completing multiple iterations of training, reliable final weights may be obtained for contact center system agents and contact center system agent skills.

In block 114, the computing system 700 may determine/compare a similarity of at least one of two or more of the contact center system agent embeddings, two or more of the contact center system agent skills embeddings, and two or more of the contact center system virtual queue embeddings based on the final weights of the at least one of the one or more of the contact center system agent embeddings, the one or more of the contact center system agent skills embeddings, and the one or more of the contact center system virtual queue embeddings. It should be appreciated that the computing system 700 may utilize various visualization techniques to determine the similarity of the embeddings. In some embodiments, the computing system 700 may utilize at least one of cosine similarity, principal component analysis (e.g., PCA), or t-distributed stochastic neighbor embedding (e.g., t-SNE) to determine the similarity of the embeddings. For example, referring back to FIG. 3, the computing system 700 may utilize a visualization technique to determine that Agent 1 is similar to Agent 2 and Agent 3 but is most similar to Agent 2. In the illustrative embodiment, this similarity determination may be stored in one or more databases, data structures, and/or data storage devices capable of storing data in the computing system 700. Similarly, the computing system 700 may determine that Skill/VQ 1 is similar to Skill/VQ 2 and Skill/VQ M but is most similar to Skill/VQ 2. For example, the computing system 700 may determine that Agents that have Language Skill 2 may also have Language Skill 1 and that those two skills may be related (e.g., neighboring languages German and Polish). This similarity determination may also be stored in one or more databases, data structures, and/or data storage devices capable of storing data in the computing system 700.

Although the blocks 102-114 are described in a relatively serial manner, it should be appreciated that various blocks of the method 100 may be performed in parallel in some embodiments.

Figure 5:
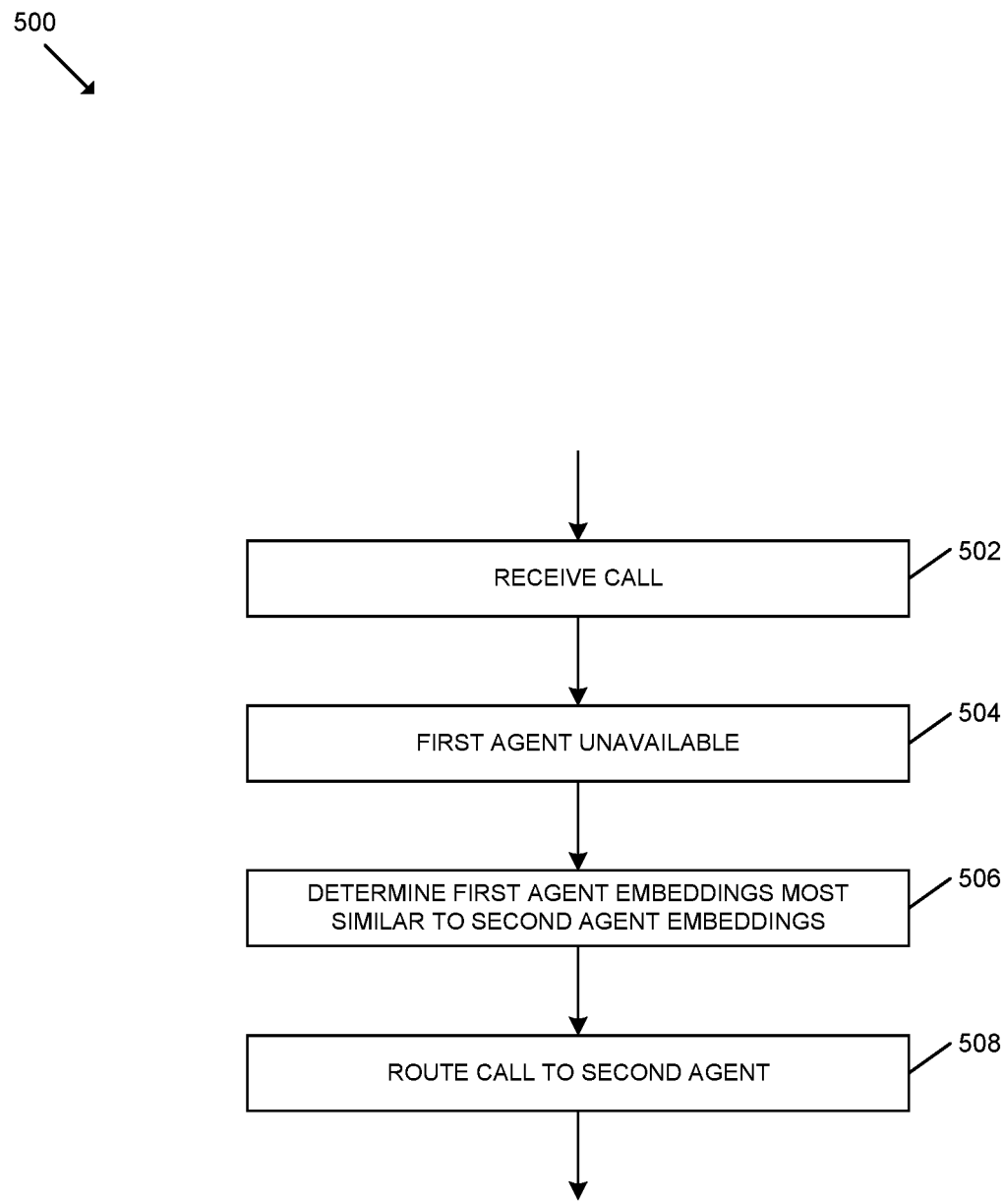
FIG. 5 is a simplified flow diagram of at least one embodiment of a method for routing a call to an available agent based on automated generation of contact center system embeddings using the method of FIG. 1.

Referring now to FIG. 5, in use, the computing system 700 may execute a method 500 for routing a call to an available agent based on automated generation of contact center system embeddings. It should be appreciated that the particular blocks of the method 500 are illustrated by way of example, and such blocks may be combined or divided, added or removed, and/or reordered in whole or in part depending on the particular embodiment, unless stated to the contrary. The illustrative method 500 may begin with block 502 in which the computing system 700 may receive a call from an end user. In block 504, the computing system 700 may determine that an agent that is most qualified to answer the call from the end user is unavailable (e.g., the first agent). For example, the computing system 700 may determine that Agent 1 in FIG. 3 is unavailable. In block 506, the computing system 700 may determine that first agent embeddings are most similar to second agent embeddings (e.g., Agent 1 and Agent 2 in FIG. 3 may be most similar). For example, the computing system 700 may execute the method 100 of FIG. 1 (or a portion thereof) to determine the similarity of the embeddings (e.g., see block 114 of FIG. 1). In block 508, the computing system 700 may route the call to an available agent that is most qualified to answer the call from the end user (e.g., the second agent) based on the determination made in block 506. For example, the computing system 700 may route the call to Agent 2 in FIG. 3.

Although the blocks 502-508 are described in a relatively serial manner, it should be appreciated that various blocks of the method 500 may be performed in parallel in some embodiments.

Figure 6:
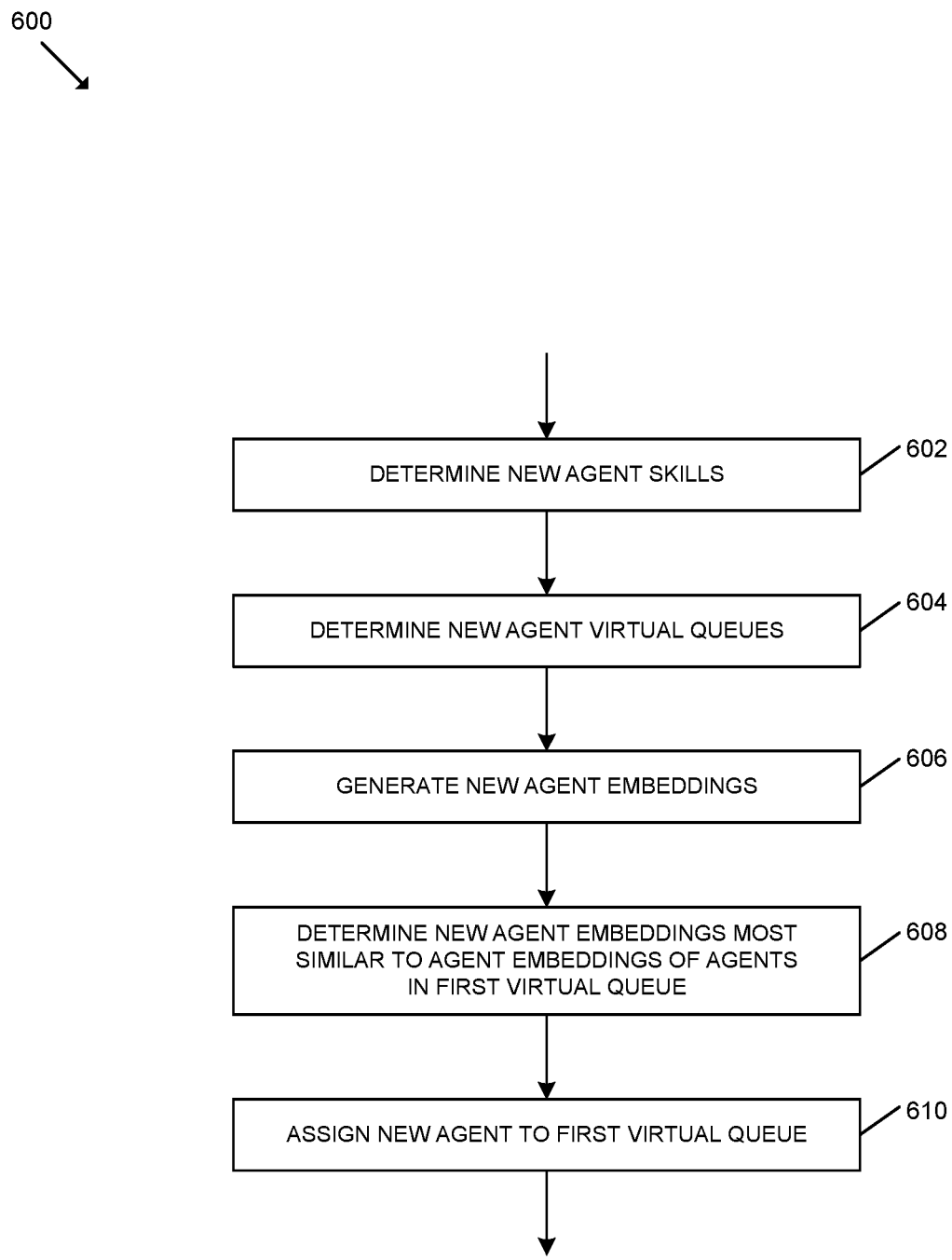
FIG. 6 is a simplified flow diagram of at least one embodiment of a method for assigning a newly hired agent to a virtual queue in a contact center system based on automated generation of contact center system embeddings using the method of FIG. 1.

Referring now to FIG. 6, in use, the computing system 700 may execute a method 600 for assigning a newly hired agent to a virtual queue in a contact center system based on automated generation of contact center system embeddings. It should be appreciated that the particular blocks of the method 600 are illustrated by way of example, and such blocks may be combined or divided, added or removed, and/or reordered in whole or in part depending on the particular embodiment, unless stated to the contrary. The illustrative method 600 may begin with block 602 in which the computing system 700 may determine that a newly hired agent possesses one or more contact center system agent skills (e.g., see block 102 of FIG. 1). In block 604, the computing system 700 may determine that the agent has one or more virtual queue experiences (e.g., see block 104 of FIG. 1). In block 606, the computing system 700 may generate a contact center system agent embedding for the newly hired agent and at least one of one or more contact center system agent skills embeddings and one or more contact center system virtual queue embeddings for the newly hired agent (see, for example, the method 100 of FIG. 1). In block 608, the computing system 700 may determine that the newly hired agent embeddings are most similar to a cluster of agent embeddings in a first virtual queue. For example, the computing system 700 may execute the method 100 of FIG. 1 (or a portion thereof) to determine the similarity of the embeddings (e.g., see block 114 of FIG. 1). In block 610, the computing system 700 may assign the newly hired agent to the first virtual queue based on the determination made in block 608.

Although the blocks 602-610 are described in a relatively serial manner, it should be appreciated that various blocks of the method 600 may be performed in parallel in some embodiments.

While the method 100 of FIG. 1 and the method 600 of FIG. 6 may apply to contact center systems, it should be appreciated that, in an embodiment, such methods may apply to general enterprises. For example, if a newly hired account manager joins an enterprise, a profile may be created for that account manager based on their skills and past work history derived from their resume, job application, and/or other information. In such an embodiment, the computing system 700 may assign the account manager to a particular product department within the enterprise based on similarities among the profiles of other peers in that product department.

Figure 7:
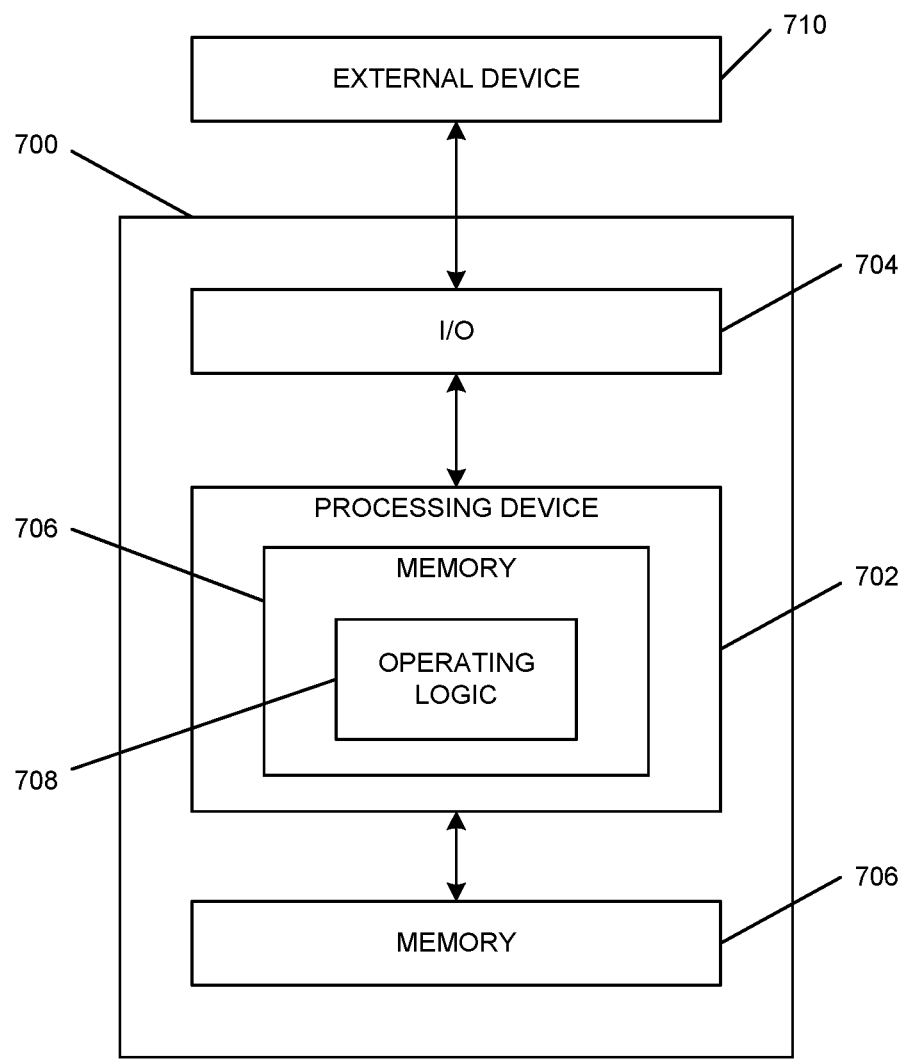
FIG. 7 is a simplified block diagram of at least one embodiment of a computing system.

Referring now to FIG. 7, a simplified block diagram of at least one embodiment of a computing system 700 is shown. The illustrative computing system 700 may execute the method 100 of FIG. 1, the method 500 of FIG. 5, and/or the method 600 of FIG. 6 as described in detail above. Depending on the particular embodiment, the computing system 700 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing system 700 includes a processing device 702 that executes algorithms and/or processes data in accordance with operating logic 708, an input/output device 704 that enables communication between the computing system 700 and one or more external devices 710, and memory 706 which stores, for example, data received from the external device 710 via the input/output device 704.

The input/output device 704 allows the computing system 700 to communicate with the external device 710. For example, the input/output device 704 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing system 700 may be configured to use any one or more communication technologies (e.g., wireless or wired communications) and associated protocols (e.g., Ethernet, Bluetooth®, Wi-Fi®, WiMAX, etc.) to effect such communication depending on the particular computing system 700. The input/output device 704 may include hardware, software, and/or firmware suitable for performing the techniques described herein.

The external device 710 may be any type of device that allows data to be inputted or outputted from the computing system 700. For example, in various embodiments, the external device 710 may be embodied as another computing device, switch, diagnostic tool, controller, printer, display, alarm, peripheral device (e.g., keyboard, mouse, monitor/display, touch screen display, speakers, headphones, etc.), and/or any other computing, processing, and/or communication device capable of performing the functions described herein. Furthermore, in some embodiments, it should be appreciated that the external device 710 may be integrated into the computing system 700.

The processing device 702 may be embodied as any type of processor(s) capable of performing the functions described herein. In particular, the processing device 702 may be embodied as one or more single or multi-core processors, microcontrollers, or other processor or processing/controlling circuits. For example, in some embodiments, the processing device 702 may include or be embodied as an arithmetic logic unit (ALU), central processing unit (CPU), digital signal processor (DSP), and/or another suitable processor(s). The processing device 702 may be a programmable type, a dedicated hardwired state machine, or a combination thereof. Processing devices 702 with multiple processing units may utilize distributed, pipelined, and/or parallel processing in various embodiments. Further, the processing device 702 may be dedicated to performance of just the operations described herein, or may be utilized in one or more additional applications. In the illustrative embodiment, the processing device 702 is programmable and executes algorithms and/or processes data in accordance with operating logic 708 as defined by programming instructions (such as software or firmware) stored in memory 706.

Additionally or alternatively, the operating logic 708 for processing device 702 may be at least partially defined by hardwired logic or other hardware. Further, the processing device 702 may include one or more components of any type suitable to process the signals received from input/output device 704 or from other components or devices and to provide desired output signals. Such components may include digital circuitry, analog circuitry, or a combination thereof.

The memory 706 may be of one or more types of non-transitory computer-readable media, such as a solid-state memory, electromagnetic memory, optical memory, or a combination thereof. Furthermore, the memory 706 may be volatile and/or nonvolatile and, in some embodiments, some or all of the memory 706 may be of a portable type, such as a disk, tape, memory stick, cartridge, and/or other suitable portable memory. In operation, the memory 706 may store various data and software used during operation of the computing system 700 such as operating systems, applications, programs, libraries, and drivers. It should be appreciated that the memory 706 may store data that is manipulated by the operating logic 708 of processing device 702, such as, for example, data representative of signals received from and/or sent to the input/output device 704 in addition to or in lieu of storing programming instructions defining operating logic 708. As shown in FIG. 7, the memory 706 may be included with the processing device 702 and/or coupled to the processing device 702 depending on the particular embodiment. For example, in some embodiments, the processing device 702, the memory 706, and/or other components of the computing system 700 may form a portion of a system-on-a-chip (SoC) and be incorporated on a single integrated circuit chip.

In some embodiments, various components of the computing system 700 (e.g., the processing device 702 and the memory 706) may be communicatively coupled via an input/output subsystem, which may be embodied as circuitry and/or components to facilitate input/output operations with the processing device 702, the memory 706, and other components of the computing system 700. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing system 700 may include other or additional components, such as those commonly found in a typical computing device (e.g., various input/output devices and/or other components), in other embodiments. It should be further appreciated that one or more of the components of the computing system 700 described herein may be distributed across multiple computing devices. In other words, the techniques described herein may be employed by a computing system that includes one or more computing devices. Additionally, although only a single processing device 702, I/O device 704, and memory 706 are illustratively shown in FIG. 7, it should be appreciated that a particular computing system 700 may include multiple processing devices 702, I/O devices 704, and/or memories 706 in other embodiments. Further, in some embodiments, more than one external device 710 may be in communication with the computing system 700.

What is claimed is:

1. A method for automated generation of contact center system embeddings, the method comprising:

determining, by a computing system, at least one of one or more contact center system agents, one or more contact center system agent skills, and one or more contact center system virtual queue experiences;

generating, by the computing system, a matrix representation based on the at least one of the one or more contact center system agents, the one or more contact center system agent skills, and the one or more contact center system virtual queue experiences;

generating, by the computing system and based on the matrix representation, at least one of one or more contact center system agent identifiers, one or more contact center system agent skills identifiers, and one or more contact center system virtual queue identifiers;

transforming, by the computing system, the at least one of the one or more contact center system agent identifiers, the one or more contact center system agent skills identifiers, and the one or more contact center system virtual queue identifiers into at least one of one or more contact center system agent embeddings, one or more contact center system agent skills embeddings, and one or more contact center system virtual queue embeddings, wherein weights of the at least one of the one or more contact center system agent embeddings, the one or more contact center system agent skills embeddings, and the one or more contact center system virtual queue embeddings are randomly initialized; and training, by the computing system, the at least one of the one or more contact center system agent embeddings, the one or more contact center system agent skills embeddings, and the one or more contact center system virtual queue embeddings by applying machine learning to obtain final weights of the at least one of the one or more contact center system agent embeddings, the one or more contact center system agent skills embeddings, and the one or more contact center system virtual queue embeddings.

2. The method of claim 1, further comprising determining, by the computing system, a similarity of at least one of two or more of the contact center system agent embeddings, two or more of the contact center system agent skills embeddings, and two or more of the contact center system virtual queue embeddings based on comparing the final weights of the at least one of the one or more of the contact center system agent embeddings, the one or more of the contact center system agent skills embeddings, and the one or more of the contact center system virtual queue embeddings.

3. The method of claim 2, wherein determining the similarity of the at least one of the two or more contact center system agent embeddings, the two or more contact center system agent skills embeddings, and the two or more contact center system virtual queue embeddings comprises utilizing at least one of cosine similarity, principal component analysis, or t-distributed stochastic neighbor embedding.

4. The method of claim 2, further comprising at least one of:

routing a telephony call to a contact center system agent in response to determining the similarity of the at least one of the two or more of the contact center system agent embeddings, the two or more of the contact center system agent skills embeddings, and the two or more of the contact center system virtual queue embeddings; and assigning a contact center system agent to a virtual queue in response to determining the similarity of the at least one of the two or more of the contact center system agent embeddings, the two or more of the contact center system agent skills embeddings, and the two or more of the contact center system virtual queue embeddings.

5. The method of claim 1, wherein the at least one of the one or more contact center system agent embeddings, the one or more contact center system agent skills embeddings, and the one or more contact center system virtual queue embeddings comprise k-dimensional vectors.

6. The method of claim 5, wherein the k-dimensional vectors are in five-dimensional space or ten-dimensional space.

7. The method of claim 1, wherein at least one of the transforming and the training are based on a neural network.

8. The method of claim 1, further comprising transforming the matrix representation into a single row representation for training.

9. The method of claim 1, wherein applying machine learning to obtain the final weights comprises determining a dot product and ground truth of the at least one of the one or more contact center system agent embeddings, the one or more contact center system agent skills embeddings, and the one or more contact center system virtual queue embeddings.

10. The method of claim 1, wherein the one or more contact center system agent skills comprises at least one of one or more language skills, one or more product skills, or one or more education skills.

11. A system for automated generation of contact center system embeddings, the system comprising:
    at least one processor; and
    at least one memory comprising a plurality of instructions stored thereon that, in response to execution by the at least one processor, causes the system to:
        determine, by a computing system, at least one of one or more contact center system agents, one or more contact center system agent skills, and one or more contact center system virtual queue experiences;
        generate, by the computing system, a matrix representation based on the at least one of the one or more contact center system agents, the one or more contact center system agent skills, and the one or more contact center system virtual queue experiences;
        generate, by the computing system and based on the matrix representation, at least one of one or more contact center system agent identifiers, one or more contact center system agent skills identifiers, and one or more contact center system virtual queue identifiers;
        transform, by the computing system, the at least one of the one or more contact center system agent identifiers, the one or more contact center system agent skills identifiers, and the one or more contact center system virtual queue identifiers into at least one of one or more contact center system agent embeddings, one or more contact center system agent skills embeddings, and one or more contact center system virtual queue embeddings, wherein weights of the at least one of the one or more contact center system agent embeddings, the one or more contact center system agent skills embeddings, and the one or more contact center system virtual queue embeddings are randomly initialized; and
        train, by the computing system, the at least one of the one or more contact center system agent embeddings, the one or more contact center system agent skills embeddings, and the one or more contact center system virtual queue embeddings by applying machine learning to obtain final weights of the at least one of the one or more contact center system agent embeddings, the one or more contact center system agent skills embeddings, and the one or more contact center system virtual queue embeddings.

12. The system of claim 11, wherein the plurality of instructions further causes the system to:
    determine, by the computing system, a similarity of at least one of two or more of the contact center system agent embeddings, two or more of the contact center system agent skills embeddings, and two or more of the contact center system virtual queue embeddings based on comparing the final weights of the at least one of the one or more of the contact center system agent embeddings, the one or more of the contact center system agent skills embeddings, and the one or more of the contact center system virtual queue embeddings.

13. The system of claim 12, wherein determining the similarity of the at least one of the two or more contact center system agent embeddings, the two or more contact center system agent skills embeddings, and the two or more contact center system virtual queue embeddings comprises utilizing at least one of cosine similarity, principal component analysis, or t-distributed stochastic neighbor embedding.

14. The system of claim 12, wherein the plurality of instructions further causes the system to:
    route a telephony call to a contact center system agent in response to determining the similarity of the at least one of the two or more of the contact center system agent embeddings, the two or more of the contact center system agent skills embeddings, and the two or more of the contact center system virtual queue embeddings; or
    assign a contact center system agent to a virtual queue in response to determining the similarity of the at least one of the two or more of the contact center system agent embeddings, the two or more of the contact center system agent skills embeddings, and the two or more of the contact center system virtual queue embeddings.

15. The system of claim 11, wherein the at least one of the one or more contact center system agent embeddings, the one or more contact center system agent skills embeddings, and the one or more contact center system virtual queue embeddings comprise k-dimensional vectors.

16. The system of claim 15, wherein the k-dimensional vectors are in five-dimensional space or ten-dimensional space.

17. The system of claim 11, wherein at least one of the transforming and the training are based on a neural network.

18. The system of claim 11, wherein the plurality of instructions further causes the system to:
    transform the matrix representation into a single row representation for training.

19. The system of claim 11, wherein applying machine learning to obtain the final weights comprises determining a dot product and ground truth of the at least one of the one or more contact center system agent embeddings, the one or more contact center system agent skills embeddings, and the one or more contact center system virtual queue embeddings.

20. The system of claim 11, wherein the one or more contact center system agent skills comprises at least one of one or more language skills, one or more product skills, or one or more education skills.

* * * * *